(12) United States Patent
Dickinson et al.

(10) Patent No.: US 8,452,504 B2
(45) Date of Patent: May 28, 2013

(54) CONTROL SYSTEM AND METHOD FOR AUTOMATIC CONTROL OF SELECTION OF ON-DEMAND ALL-WHEEL DRIVE ASSEMBLY FOR A VEHICLE DRIVETRAIN

(75) Inventors: Michael Thomas Dickinson, Hilliard, OH (US); Andrew J. Fox, Powell, OH (US)

(73) Assignee: Honda Motor Co., Ltd., Tokyo (JP)

(*) Notice: Subject to any disclaimer, the term of this patent is extended or adjusted under 35 U.S.C. 154(b) by 187 days.

(21) Appl. No.: 12/847,880

(22) Filed: Jul. 30, 2010

(65) Prior Publication Data

US 2012/0029779 A1 Feb. 2, 2012

(51) Int. Cl.
*G06F 7/00* (2006.01)

(52) U.S. Cl.
USPC ........... 701/69; 180/65.28; 475/280; 475/281

(58) Field of Classification Search
USPC ................ 701/69, 22; 180/65.28; 475/280, 475/281, 198
See application file for complete search history.

(56) References Cited

U.S. PATENT DOCUMENTS

| | | |
|---|---|---|
| 2,730,914 A | 1/1956 | Rockwell |
| 4,601,359 A | 7/1986 | Weismann et al. |
| 4,630,704 A | 12/1986 | Yamakawa et al. |
| 4,768,609 A | 9/1988 | Taga et al. |
| 4,955,848 A | 9/1990 | Kotajima |
| 4,974,473 A | 12/1990 | Hatakeyama |
| 5,020,626 A | 6/1991 | Kodama |
| 5,054,335 A | 10/1991 | Andrews |
| 5,056,614 A | 10/1991 | Tokushima et al. |
| 5,058,700 A | 10/1991 | Shibahata |
| 5,119,900 A | 6/1992 | Watanabe et al. |
| 5,135,071 A | 8/1992 | Shibahata et al. |
| 5,141,072 A | 8/1992 | Shibahata |
| 5,353,889 A | 10/1994 | Hamada |
| 5,411,110 A | 5/1995 | Wilson et al. |
| 5,456,641 A | 10/1995 | Sawase |
| 5,669,850 A | 9/1997 | Dourra et al. |
| 5,728,022 A | 3/1998 | Schultz |
| 5,924,952 A | 7/1999 | Bowen |
| 5,989,146 A | 11/1999 | Brown et al. |

(Continued)

FOREIGN PATENT DOCUMENTS

| | | |
|---|---|---|
| DE | 4409224 A1 | 10/1994 |
| WO | 2008/016537 A2 | 2/2008 |

*Primary Examiner* — Thomas Black
*Assistant Examiner* — Shardul Patel
(74) *Attorney, Agent, or Firm* — Kenealy Vaidya LLP

(57) ABSTRACT

A vehicle drivetrain can include various structures, such as a multi-ratio transmission, a two-speed final drive assembly connected in series with the multi-ratio transmission and including a low speed final drive ratio and a high speed final drive ratio, a pair of front driveshafts driven by the two-speed final drive assembly, a pair of rear driveshafts, a rear differential assembly connected to the two-speed final drive assembly, and a control assembly including. The control assembly can include a controller in electrical communication with portions of the rear differential assembly, such as a variable displacement pump and purge valve. An input array can be in electrical communication with the controller and can include a plurality of sensors, and at least one switch accessible to an operator of the vehicle. Various related methods can also be executed for control and operation of such a drivetrain. The methods can incorporate a number of variables in order to control the drivetrain, and the variables can include but are not limited to road grade, vehicle acceleration, vehicle speed, presence of towing apparatus, road surface conditions, switch condition(s), etc.

28 Claims, 5 Drawing Sheets

U.S. PATENT DOCUMENTS

| | | | |
|---|---|---|---|
| 6,042,504 A | 3/2000 | Gualtieri et al. |
| 6,056,666 A | 5/2000 | Williams |
| 6,064,934 A | 5/2000 | Zhang |
| 6,086,515 A | 7/2000 | Buschmann et al. |
| 6,095,276 A | 8/2000 | Kuroda et al. |
| 6,105,703 A | 8/2000 | Kuroda et al. |
| 6,213,242 B1 | 4/2001 | Rodrigues et al. |
| 6,251,045 B1 | 6/2001 | Oliveira et al. |
| 6,257,082 B1 | 7/2001 | Ore |
| 6,549,840 B1 | 4/2003 | Mikami et al. |
| 6,579,208 B2 | 6/2003 | Oliveira et al. |
| 6,697,725 B1 | 2/2004 | Williams |
| 6,699,151 B2 | 3/2004 | Grogg et al. |
| 6,725,989 B1 | 4/2004 | Krisher et al. |
| 6,814,682 B2 | 11/2004 | Spitale |
| 6,817,434 B1 | 11/2004 | Sweet |
| 6,848,555 B2 | 2/2005 | Sakata et al. |
| 6,942,592 B1 | 9/2005 | Haka |
| 7,004,874 B2 * | 2/2006 | Mizon et al. ................... 475/198 |
| 7,021,445 B2 | 4/2006 | Brissenden et al. |
| 7,062,984 B2 | 6/2006 | Haka |
| 7,086,987 B2 | 8/2006 | Janson et al. |
| 7,136,735 B2 | 11/2006 | Carlson et al. |
| 7,146,266 B2 * | 12/2006 | Teslak et al. .................... 701/69 |
| 7,217,209 B2 | 5/2007 | Saito et al. |
| 7,343,998 B2 | 3/2008 | Morin et al. |
| 7,349,776 B2 | 3/2008 | Spillane et al. |
| 7,442,148 B2 | 10/2008 | Eckle et al. |
| 7,455,134 B2 | 11/2008 | Severinsky et al. |
| 7,458,917 B2 | 12/2008 | Yoshikawa et al. |
| 7,549,497 B2 | 6/2009 | Homan et al. |
| 7,678,003 B2 | 3/2010 | Janson et al. |
| 2002/0155916 A1 | 10/2002 | Brown et al. |
| 2003/0211913 A1 | 11/2003 | Spitale |
| 2004/0029673 A1 | 2/2004 | Lipman |
| 2004/0099459 A1 | 5/2004 | Nakasako et al. |
| 2005/0004732 A1 | 1/2005 | Berry et al. |
| 2005/0202918 A1 * | 9/2005 | Mizon et al. ................... 475/198 |
| 2006/0094556 A1 * | 5/2006 | Mizon et al. ................... 475/198 |
| 2006/0111823 A1 | 5/2006 | Tamai |
| 2007/0010927 A1 | 1/2007 | Rowley et al. |
| 2007/0016351 A1 | 1/2007 | Allen et al. |
| 2007/0049451 A1 | 3/2007 | Mizon et al. |
| 2007/0093347 A1 | 4/2007 | Janson et al. |
| 2007/0096557 A1 | 5/2007 | Tamai et al. |
| 2007/0219695 A1 | 9/2007 | Chiu et al. |
| 2007/0281823 A1 | 12/2007 | Hun |
| 2007/0299581 A1 | 12/2007 | Torralbo et al. |
| 2008/0046158 A1 | 2/2008 | Carey et al. |
| 2009/0032359 A1 | 2/2009 | Asano |
| 2009/0032360 A1 | 2/2009 | Asano |
| 2009/0099762 A1 | 4/2009 | Heinzmann et al. |
| 2010/0228412 A1 * | 9/2010 | Sah .................................. 701/22 |
| 2011/0021301 A1 * | 1/2011 | Asano et al. ..................... 475/86 |

* cited by examiner

CONTROL SYSTEM AND METHOD FOR AUTOMATIC CONTROL OF SELECTION OF ON-DEMAND ALL-WHEEL DRIVE ASSEMBLY FOR A VEHICLE DRIVETRAIN

BACKGROUND

1. Field

The present invention relates to devices, systems, and processes useful as a control system for a vehicle drivetrain, and in particular, for automatically selecting components and/or characteristics for a vehicle drivetrain.

2. Description of the Related Art

Typical vehicle drivetrains can be configured as either two-wheel-drive (e.g., front-wheel drive or rear-wheel drive) or all-wheel drive (e.g., part-time or full-time). One example of a part-time, all-wheel-drive vehicle drivetrain is described in U.S. Pat. No. 5,135,071 to Shibahata et al. In a part-time, all-wheel-drive configuration, the vehicle drivetrain operates primarily in a two-wheel-drive configuration and the vehicle is propelled by primary drive wheels (e.g., front wheels) and the secondary drive wheels (e.g., rear wheels) are selectively engaged to improve tractive effort as conditions warrant. The secondary drive wheels are disengaged to maximize fuel efficiency in conditions where two-wheel-drive propulsion is sufficient. Engagement/disengagement of the secondary drive wheels can be initiated by the vehicle operator through a mechanical linkage or via an electrical switch and electro-mechanical actuator assembly. Alternatively, a passive hydro-mechanical system can be utilized, such as that disclosed by Shibahata et al. Another alternate approach to engage/disengage the secondary drive wheels can employ an electronic control unit (ECU) to engage/disengage the secondary drive wheels via an actuator assembly in electrical communication with the ECU.

Certain all-wheel drive vehicles, such as sports-utility vehicles (SUVs) and pick-ups, are used for towing and hauling heavy loads. To further supplement tractive effort when towing or hauling heavy loads, the drivetrain of these types of vehicles can include a range gearbox in series with the multi-ratio transmission. The range gearbox typically includes a gear reduction assembly that provides a high range drive ratio for normal driving speeds and a low range drive ratio for low driving speeds such as when the vehicle is driven off-road, when high torque is desired, when low traction surfaces exist, etc. For example, the low range drive ratio can be used when starting from a stop on an incline with a heavy load or with a trailer in tow (i.e., when engine load is high). Each of the high range drive ratio and the low range drive ratio can be used with any one of the reverse drive ratio and the plurality of forward drive ratios available in the multi-ratio transmission. The vehicle operator can select and engage/disengage the low range drive ratio or the high range drive ratio via a mechanical linkage or via an electrical switch and electro-mechanical actuator assembly.

U.S. Patent Application No. 2005/0004732 to Berry et al. and U.S. Pat. No. 7,349,776 to Spillane et al. each disclose an exemplary vehicle drivetrain that includes selection and engagement/disengagement of the high or low range drive ratios via a switch positioned by the vehicle operator. Further, positioning of the switch by the operator of the vehicle can toggle the rear differential between a locked position and an unlocked position. Because these drivetrains rely on actuation of a switch by the operator, selection and engagement/disengagement of the low or high range drive ratio and/or locking/unlocking of the rear differential is not fully automated.

Accordingly, there is a need for a fully automated control of the selection, engagement and/or modulation of various components of the vehicle drivetrain without a specific and deliberate prompt from the vehicle operator, as well as to provide operating parameters for an ECU that provide efficient and accurate automatic selection/modulation of the drivetrain components.

SUMMARY

According to one aspect of the disclosure a drivetrain for a vehicle can include a multi-ratio transmission, a two-speed final drive assembly connected in series with the multi-ratio transmission and including a low speed final drive ratio and a high speed final drive ratio, a pair of front driveshafts driven by the two-speed final drive assembly, a pair of rear driveshafts, a rear differential assembly connected to the two-speed final drive assembly. The rear differential assembly can include a high capacity mode and a low capacity mode, an input member driven by the two-speed final drive assembly, first and second clutch assemblies selectively coupling the input member to a respective one of the pair of rear driveshafts. Each of the clutch assemblies can include a plurality of driven plates connected to the input member, and a plurality of driving plates selectively engageable with the plurality of driven plates, first and second pistons each associated with a respective one of the first and second clutch assemblies, each of the first and second pistons configured to displace the plurality of driving plates into engagement with the plurality of driven plates. The rear differential assembly can also include a variable displacement pump, and a purge valve, wherein the purge valve and at least one of the first and second pistons are in parallel fluid communication with the variable displacement pump. The drivetrain can further include a control assembly having a controller in electrical communication with the variable displacement pump and the purge valve, and an input array in electrical communication with the control unit and including a plurality of sensors, and at least one switch accessible to an operator of the vehicle.

According to another aspect of the disclosed subject matter, a method for controlling a drivetrain of a vehicle can include providing a pair of front driveshafts and a multi-ratio transmission connected to the pair of front driveshafts, providing a pair of rear drive shafts and a rear differential assembly connected to the pair of rear driveshafts, the rear differential assembly having a low capacity mode and a high capacity mode, collecting data indicative of at least one of a dynamic condition of the vehicle and a static condition of the vehicle, and operating the rear differential assembly in one of the low capacity mode and the high capacity mode based on the data.

According to another aspect of the disclosed subject matter, a drivetrain for a vehicle can include an engine, a pair of front driveshafts, a pair of rear driveshafts, a multi-ratio transmission driven by the engine, including a plurality of forward drive ratios, a reverse drive ratio, and an output gear rotating about an output axis, a two-speed final drive assembly driven by the multi-ratio transmission and connected in series between the multi-ratio transmission and each of the front driveshafts, wherein the two-speed drive assembly includes a high range final drive ratio and a low range final drive ratio, a propeller shaft extending longitudinally from the two-speed final drive assembly toward the pair of rear driveshafts, a first clutch assembly selectively connecting the propeller shaft to the two-speed final drive assembly, and a rear differential assembly connected to the propeller shaft, the rear differential assembly including a second clutch assembly selectively connecting one of the pair of rear driveshafts to the propeller shaft, and a third clutch assembly selectively connecting another one of the pair of rear driveshafts to the propeller shaft.

According to yet another aspect of the disclosed subject matter, a method for controlling a drivetrain of a vehicle having a longitudinal axis and a transverse axis can include providing a pair of front driveshafts extending substantially parallel to the transverse direction, a pair of rear driveshafts spaced along the longitudinal axis from the pair of front driveshafts and extending in the transverse direction, a multi-ratio transmission, a two-speed final drive assembly connected in series with the multi-ratio transmission, a power-take-off assembly selectively connectable to the two-speed final drive assembly, a propeller shaft selectively connectable to the two-speed final drive assembly and extending substantially parallel with the longitudinal axis, a rear input gear driven by the propeller shaft, and a rear output gear driven by the rear input gear and selectively connectable to the pair of rear driveshafts, wherein the two-speed final drive assembly includes a low range final drive ratio and a high range final drive ratio. The method can also include providing a FWD mode where the pair of front driveshafts are driven by the multi-ratio transmission and the pair of rear driveshafts are disconnected from the multi-ratio transmission, and providing an AWD mode where the pair of front driveshafts and the pair of rear driveshafts are driven by the multi-ratio transmission. The method can further include selecting the FWD mode or the AWD mode, rotationally isolating the propeller shaft from the multi-ratio transmission and each of the pair of rear driveshafts when the FWD mode is selected, selecting the low range final drive ratio or the high range final drive ratio when the AWD mode is selected, and manipulating torque distribution to the rear driveshafts when the AWD mode is selected.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
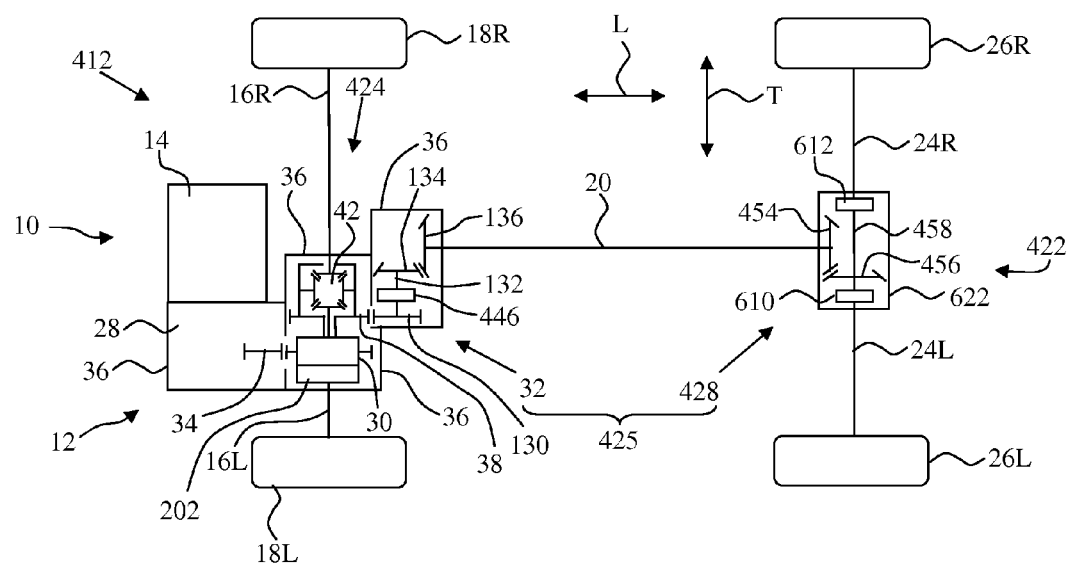
FIG. 1 is a schematic view of a powertrain of a vehicle made in accordance with principles of the disclosed subject matter.

FIG. 1 illustrates an embodiment of a powertrain 412 of a vehicle 10 made in accordance with principles of the disclosed subject matter. The powertrain 412 can include a power source 14 and a drivetrain 422. The power source 14 can be an internal combustion engine, an electric motor, a hybrid power source, or other power source as is known in the art. In the exemplary embodiment represented in FIG. 1, the power source 14 is an internal combustion engine. The drivetrain 422 can be connected to the internal combustion engine 14 in any manner known in the art.

The drivetrain 422 can be converted between a front-wheel-drive mode and an all-wheel-drive mode, automatically or manually, as will be discussed in detail below. When in the front-wheel-drive (FWD) mode, a substantial portion of the all-wheel-drive (AWD) mode components of the drivetrain 422 can be rotationally isolated from the internal combustion engine 14 and the rear wheels 26L, 26R of the vehicle 10 to maximize fuel economy by minimizing parasitic losses that can be caused by rotational inertia, friction, etc., of the components (if not isolated).

The drivetrain 422 can include a two-speed final drive assembly 30 in series with a multi-ratio transmission 28 that can be used to significantly increase the torque generated by the internal combustion engine 14 and transmitted to the any of the wheels 18L, 18R, 26L, 26R of the vehicle 10. The two-speed final drive assembly 30 can be used to enhance tractive effort of the vehicle 10 under particular driving conditions, such as, when the vehicle 10 is heavily laden with cargo, and/or towing a trailer from rest, and/or traversing unpaved terrain, as well as during other driving conditions.

The drivetrain 422 also can include a rear differential assembly 622 that can readily modulate across a substantial range the amount of torque transmitted from the engine 14 to the rear wheels 26L, 26R of the vehicle 10. This substantial range can enable the rear differential assembly 622 to adjust to and effectively transmit the substantial changes in torque that can be generated by changes in the two-speed final drive assembly 30.

Selection of the drivetrain mode (i.e., FWD mode or AWD mode), control of the two-speed final drive assembly 30, and control of the rear differential assembly 622 can be performed automatically by an electronic control unit or manually by an operator of the vehicle 10. The control of the rear differential assembly 622 can be integrated with the control of the two-speed final drive assembly 30. The control of the two-speed final drive assembly 30 and control of the rear differential assembly 622 can also be integrated with the selection of the drivetrain mode. Further details of the control configuration and method that can be executed by the electronic control unit of the final drive assembly 30, and the control of the rear differential assembly 622 and the selection of the drivetrain mode will be discussed below.

Details of the components of the drivetrain 422 will now be discussed with reference to FIG. 1. The drivetrain 422 can include a transaxle 12, a pair of front driveshafts 16L, 16R, a propeller shaft 20, the rear differential assembly 622 and a pair of rear driveshafts 24L, 24R. The transaxle 12 can include the multi-ratio transmission 28, the two-speed final drive assembly 30 and a power-take-off assembly 32. The transaxle 12 can be configured such that it is accommodated within the engine compartment of the vehicle 10. Accordingly, the passenger compartment of the vehicle 10 need not accommodate the transaxle 12.

The multi-ratio gear transmission 28 can be connected to and driven by the internal combustion engine 14 in a manner that is known in the art. The multi-ratio transmission 28 can include a plurality of drive ratios and an output gear 34. The output gear 34 can be driven at an output speed that is a function of the speed of the internal combustion engine 14 and the selected one of the drive ratios. The multi-ratio transmission 28 can include a discrete number of forward drive ratios and a reverse drive ratio, which can be selected manually by an operator of the vehicle 10 or automatically, as is known in the art. U.S. Pat. No. 4,974,473, the entirety of which is incorporated herein by reference, discloses an example of a conventional automatic transmission that has a plurality of discrete forward drive ratios and a reverse drive ratio.

Alternatively, the multi-ratio transmission 28 can include a plurality of forward drive ratios that can be varied continuously within the multi-ratio transmission 28 between a minimum drive ratio and a maximum drive ratio. The continuously variable multi-ratio transmission can also include a reverse drive ratio. U.S. Pat. No. 7,217,209, the entirety of which is incorporated herein by reference, discloses an example of a continuously variable multi-ratio transmission.

The two-speed final drive assembly 30 can be driven by the output gear 34 of the multi-ratio transmission 28 and can drive each of the front driveshafts 16L, 16R and the power-take-off assembly 32 based on a selected one of a high range final drive ratio and a low range final drive ratio. Each of the high range final drive ratio and the low range final drive ratio can be selected independent of the ratio selected in the multi-ratio transmission 28. That is, the two-speed final drive assembly 30 can provide the selected one of the high range final drive ratio and the low range final drive ratio with any one of the forward ratios and the reverse ratio selected in the multi-ratio transmission 28. The two-speed final drive assembly 30 can provide a high range gearing (not illustrated) that corresponds to the high range final drive ratio and low range gearing (not illustrated) that corresponds to the low range final drive ratio. The high range gearing can be used for normal driving conditions, such as driving on a level surface, driving at highway speeds, driving on a dry road, etc. The low range gearing can be used for special driving conditions, such as driving on low traction surfaces, off-road driving, towing a trailer on an inclined surface at low speeds, starting from a stop with a trailer attached to the vehicle 10, etc. Co-pending U.S. patent application Ser. No. 12/847,639, entitled "Transversely Mounted Transaxle Having a Low Range Gear Assembly and Powertrain for a Vehicle Including Same", filed concurrently herewith and which is incorporated in its entirety herein by reference, discloses an exemplary arrangement of a high range gearing and a low range gearing for a two-speed final drive assembly.

As will be described below, a signal can be sent to an actuator 202 connected to the two-speed final drive assembly 30 which can select the appropriate one of the high rang gearing and the low range gearing. Selection of the high range gearing and the low range gearing can be performed manually by the operator of the vehicle 10 in a manner known in the art. Alternatively, the selection of the high range gearing and the low range gearing can be performed automatically in a manner such as that disclosed in co-pending U.S. patent application Ser. No. 12/847,673 entitled "Control System and Method for Automatic Selection of a Low Range Gear Ratio for a Vehicle Drivetrain", filed concurrently herewith and incorporated in its entirety herein by reference.

The transaxle 12 can include a housing 36 in which the multi-ratio transmission 28 is mounted, as is known in the art. See, for example, U.S. Pat. No. 4,974,473, referenced above. The housing 36 can also contain the two-speed final drive assembly 30 and the power take-off assembly 32.

The drivetrain 422 can include a front drive assembly 424 and an on-demand drive assembly 425. The on-demand drive assembly 425 can include the power-take-off assembly 32 and a rear drive assembly 428.

When the powertrain 412 is in the FWD mode, only the front drive assembly 424 can be driven by the internal combustion engine 14 and the multi-ratio transmission 28. In this FWD mode, a substantial majority of the components of the power-take-off assembly 32 and the rear drive assembly 428 can be rotationally isolated from the internal combustion engine 14 and the multi-ratio transmission 28.

The front drive assembly 424 can include a front differential assembly 42 and the pair of front driveshafts 16L, 16R. The front differential assembly 42 can be connected between the two-speed final drive assembly 30 and each of the front driveshafts 16L, 16R in any manner known in the art. The above-referenced co-pending U.S. patent application Ser. No. 12/847,639, entitled "Transversely Mounted Transaxle Having a Low Range Gear Assembly and Powertrain for a Vehicle Including Same", discloses an exemplary arrangement of a front differential with a two-speed drive assembly and a pair of front driveshafts.

The front differential assembly 42 can be an open-type differential assembly or a limited-slip-type differential assembly, or other as is known in the art. The front differential assembly can include a planetary gear assembly, a viscous coupling assembly, a friction clutch assembly, or any combination of these assemblies, as is known in the art.

The power-take-off assembly 32 can include an input gear 130, a power-take-off shaft 132, a power-take-off clutch 446, an intermediate gear 134, an output gear 136 and the propeller shaft 20. The input gear 130 can engage a front final drive gear 38. The front final drive gear 38 can be a component of the front differential assembly 42. The power-take-off clutch 446 can selectively couple the intermediate gear 134 to the input gear 130, as will be described below. The intermediate gear 134 can engage the output gear 136. The propeller shaft 20 can extend substantially parallel to the longitudinal direction L of the vehicle 10 from a front end of the shaft to the rear end of the shaft. The front end can be connected to the output gear 136 to rotate in unison with the output gear 136 and the rear end can be connected to the rear drive assembly 428.

The intermediate gear 134 and output gear 136 can each be bevel gears to accommodate the orientation of the rotational axis due of the propeller shaft 20, which is substantially parallel to the longitudinal direction L of the vehicle 10. The rotational axes of the input and intermediate gears 130, 134 can be substantially parallel to the transverse direction T of the vehicle 10, which is perpendicular to the longitudinal direction L. In an exemplary embodiment, the intermediate gear 134 and the output gear 136 can be hypoid bevel gears.

The rear drive assembly 428 can include the rear differential assembly 622 and the pair of rear driveshafts 24L, 24R. The rear differential assembly 622 can include an input gear 454, a rear final drive gear 456, an intermediate shaft 458 and a pair of rear clutches 610, 612. The input gear 454 can be connected to the rear end of the propeller shaft 20 in any manner known in the art. The rear final drive gear 456 can engage the input gear 454. The intermediate shaft 458 can be connected to the rear final drive gear 456 to rotate in unison with the rear final drive gear 456 in any manner known in the art. The pair of rear clutches 610, 612 can selectively couple the respective rear driveshafts 24L, 24R to the intermediate shaft 458, as will be described in detail with reference to FIG. 2. The pair of driveshafts 24L, 24R can be connected to the pair of rear wheels 26L, 26R, respectively, to rotate in unison with the respective rear wheel 26L, 26R.

The input gear 454 and rear final drive gear 456 can be bevel gears to accommodate the rotational axis of the intermediate shaft 458, which is substantially parallel to the transverse direction T and substantially perpendicular to the rotational axis of the propeller shaft 20. In an exemplary embodiment, the input gear 454 and the rear final drive gear 456 can be hypoid bevel gears.

The rear clutches 610, 612 can be independently controlled to provide a differential drive function to the rear drive assembly 428 when the power-take-off clutch 446 is in the on-demand position. That is, selective actuation of each of the rear clutches 610, 612 can permit one of the rear wheels 26L, 26R to be driven relative to the other of the rear wheels 26L, 26R by the prime mover (power source) 14 and the multi-ratio transmission 28. This selective operation will be described below with reference to FIG. 2.

U.S. Pat. No. 6,105,703, the entirety of which is incorporated herein by reference, discloses an alternate clutch assembly employed in a rear differential assembly that can be modulated to provide differential speed control of the rear wheels 26L, 26R. Alternatively, the rear differential assembly 622 can include a planetary gear assembly 650 (see FIG. 2) connected between with the clutches 610, 612 and the rear final drive gear 456 that can provide differential speed control of the rear wheels 26L, 26R in a manner known in the art such that the clutches 610, 612 can be operated simply in an ON mode or an OFF mode.

Under normal operating conditions for the vehicle 10, the drivetrain 422 can be in the FWD mode. In the FWD mode, the front wheels 18L, 18R can be driven by the prime mover 14 and the multi-ratio transmission 28, and the rear wheels 26L, 26R can be rotationally isolated from the prime mover 14 and the multi-ratio transmission 28.

The power-take-off clutch 446 and the pair of rear clutches 610, 612 can cooperate to minimize the fuel consumption for the vehicle 10 when the drivetrain 422 is in the FWD mode. In particular, the power-take-off clutch 446 can rotationally isolate the on-demand drive assembly 425 (except for possibly the input gear 130) and the pair of rear driveshafts 26L, 26R from the prime mover 14 by disconnecting the intermediate gear 134 from the input gear 130. The pair of rear clutches 610, 612 can rotationally isolate the intermediate shaft 458 from the rear driveshafts 24L, 24R by disconnecting the rear driveshafts 24L, 24R from the intermediate shaft 458. As a result, the intermediate gear 134, the output gear 136, the propeller shaft 20, the input gear 454, the rear final drive gear 456 and the intermediate shaft 458 can be rotationally isolated from the remainder of the drivetrain 422 when the drivetrain 422 is in the FWD mode while the rear driveshafts 24L, 24L and rear wheels 26L, 26R freely rotate with the movement of the vehicle 10. Because these components are rotationally isolated, the rolling resistance (due to rotational inertia and other parasitic losses) of the vehicle 10 can more closely approximate that of a FWD-only vehicle when the drivetrain 422 is in the FWD mode. This can improve the fuel economy of the vehicle 10 when the drivetrain 422 is in the FWD mode.

The power-take-off clutch 446 of FIG. 1 can be configured as a hydraulically actuated clutch assembly. Co-pending U.S. patent application Ser. No. 12/847,695, entitled "Drivetrain for a Vehicle and Method of Controlling Same", filed concurrently herewith and incorporated in its entirety herein by reference, discloses an exemplary hydraulically actuated clutch assembly.

Alternatively, the power-take-off clutch 446 can be configured as an electrically actuated clutch assembly. The above-referenced U.S. patent application Ser. No. 12/847,695, entitled "Drivetrain for a Vehicle and Method of Controlling Same", also discloses an exemplary electrically actuated clutch assembly.

Figure 2:
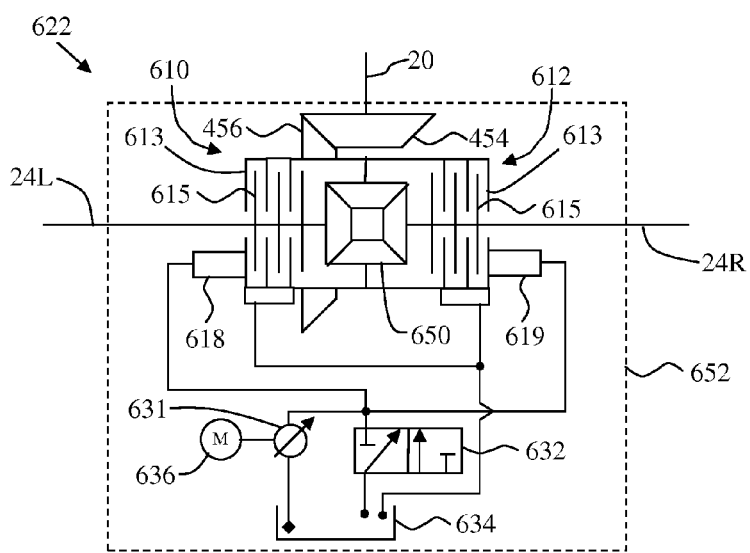
FIG. 2 is a schematic diagram of a rear differential assembly that can be implemented with the powertrain of FIG. 1.

FIG. 2 schematically illustrates components of the rear differential assembly 622 that can be used to modulate the amount of torque transmitted from the rear final drive gear 456 to the rear driveshafts 24L, 24R via the rear clutches 610, 612. In this exemplary embodiment, the rear differential assembly 622 can include a pair of actuation devices 618, 619, an on-demand variable displacement pump 631, a purge valve 632, a reservoir 634, a motor 636 and fluid lines (not numbered). The fluid lines can provide fluid communication between the pump 631, the purge valve 632, the actuation devices 618, 619 and the reservoir 634.

The motor 636 can be an electric motor and can drive the on-demand variable displacement pump 631 at any speed between zero and the maximum speed of the motor 636.

The rear clutches 610, 612 can be configured as interleaved clutch plates in any manner known in the art. In the exemplary embodiment of FIG. 2, the rear clutches 610, 612 can each include a plurality of outer clutch plates 613 and a plurality of inner clutch plates 615. The outer clutch plates 613 can be connected to and driven by the input gear 454 via the rear final drive gear 456. The inner clutch plates 615 of each rear clutch 610, 612 can be connected to a respective one of the rear driveshafts 24L, 24R. The interleaved clutch plates 613, 615 can employ splines or other connections known in the art that can permit the clutch plates 613, 615 to move toward and away from each other and transmit torque to/from the respective components (i.e., rear final drive gear 456 and rear driveshafts 24L, 24R) of the rear differential assembly 622 to which they are connected.

The actuation devices 618, 619 can be hydraulic piston/cylinder assemblies (not illustrated). Pressurized fluid from the on-demand variable displacement pump 631 can displace the piston in the respective actuation device 618, 619 to increase or decrease the force applied to the clutch plates (not numbered) in the respective rear clutch 610, 612. By varying the force applied by the piston, the amount of torque transmitted between the interleaved clutch plates 613, 615 of each rear clutch 610, 612 (and thus, to each rear driveshaft 24L, 24R) can be modulated.

The purge valve 632 and the actuation devices 618, 619 can be connected in parallel with the on-demand variable displacement pump 631. The purge valve 632 can be employed to modulate the pressure produced by the pump 631 and to pass the modulated pressurized fluid to the actuator devices 618, 619. Any method known in the art can be used to modulate the force applied by the actuation devices 618, 619 to the respective clutch plates 613, 165. Co-pending U.S. patent application Ser. No. 12/847,786, entitled "Hydraulic Vehicle Clutch System, Drivetrain for a Vehicle Including Same, and Method", filed concurrently herewith and incorporated in its entirety herein by reference, discloses exemplary methods for modulating the actuation devices 618, 619.

Other component arrangements for modulating the rear clutches 610, 612 can be used. For example, each actuation device 618, 619 can be connected to a respective pump 631 and/or a respective purge valve 632. Co-pending U.S. patent application Ser. No. 12/847,786, entitled "Hydraulic Vehicle Clutch System, Drivetrain for a Vehicle Including Same, and Method", also discloses exemplary alternate component arrangements for modulating the rear clutches 610, 612.

The on-demand variable displacement pump 631 can be advantageous when used in combination with the two-speed final drive assembly 30. The on-demand variable displacement pump 631 can increase maximum hydraulic pressure capacity and retain clutch response time and efficiency at lower pressure demands. Specifically, the on-demand variable displacement pump 631 can be set to at least a large displacement setting or a small displacement setting while also varying the speed at which the pump 631 is driven by the motor 636. This enhanced versatility can provide a greater range of on-demand hydraulic pressure provided by the pump 631. Specifically, the pump 631 can provide a first range of output flow rates and corresponding output pressures based on the large displacement setting by varying the output speed of the motor 636 between a minimum speed (e.g. zero) and a maximum (i.e., full) speed. And, the pump 631 can provide a second range of output flow rates and corresponding output pressures based on the small displacement setting by varying the output speed of the motor 636 between the minimum speed and the maximum speed. As a result, the large displacement setting of the pump 631 can provide an overall maximum output flow rate at the maximum output speed of the motor 636. And, the small displacement setting of the pump 631 can provide an overall maximum output pressure at the maximum output speed of the motor 636. Thus, pump 631 can increase maximum hydraulic pressure capacity for the clutch system and can increase clutch response time and efficiency at lower pressure demands while avoiding any required enhancement to the performance specifications of the motor 636.

On-demand variable displacement pump 631 can output a greater displacement at lower pressure demands, which can provide for faster travel of the hydraulic pistons employed by the actuation devices 618, 619. This can provide a faster reaction time for actuation of the rear clutches 610, 612. When higher hydraulic pressures are required, displacement of on-demand variable displacement pump 631 can be reduced in order to facilitate the increase in pressure of the hydraulic system without a corresponding increase in the output torque specification of motor 636. Thus, a motor having a minimized size and/or weight can be specified for the rear differential assembly 622 while simultaneously maximizing the performance capacity of the rear differential assembly 622.

Further, use of the on-demand variable displacement pump 631 can be advantageous when operated in combination with the two-speed final drive assembly 30. For example, when the two-speed final drive assembly 30 is shifted (manually or automatically) from the high range gearing to the low range gearing, a substantial increase in torque input to the rear differential assembly 622 can occur. As a result, the rear clutches 610, 612 can slip if the force applied by the actuation devices 618, 619 to the respective clutch plates 613, 615 is not sufficient. Placing the pump 631 to the low displacement setting simultaneously with, or soon after, shifting to the low range gearing can substantially increase the amount of torque that can be transmitted by the rear clutches 610, 612 without causing the rear clutches 610, 612 to slip. That is, the low displacement setting of the pump 631 can cause a substantial increase in the force applied by the actuation devices 618, 619 to the respective clutch plates 613, 615. This substantial increase in force applied by the actuation devices 618, 619 can be commensurate with the substantial increase in torque when a shift to the low range final drive ratio occurs. Thus, slippage in the rear differential assembly can be minimized or eliminated when a shift to the low range final drive ratio occurs.

In another example, placing the on-demand variable speed pump 631 to the high displacement setting when the high range gearing of the two-speed final drive assembly 30 is engaged can provide increased precision and smoothness to adjustments in torque transmission by the rear clutches 610, 612. Because less torque (relative to the low range drive ratio) is input to the rear differential assembly 622 when the high range final drive ratio is engaged, the clutches 610, 612 have less input torque to transmit. While in the high displacement setting, the pump 631 can produce pressure sufficient to prevent, or at least minimize, slippage in the clutches 610, 612. Additionally, in this setting, the pump 631 can supply fluid in higher volumes compared to the low displacement setting. These higher volumes can increase the precision and smoothness by which the piston of each actuation device is displaced. This increased precision and smoothness can enhance the riding comfort when the vehicle 10 is travelling at highway speeds or on relatively high traction surfaces.

The on-demand variable displacement pump 631 can provide the rear differential assembly 622 with four operational modes—low capacity, high capacity, full low capacity and full high capacity. When the rear differential assembly 622 is in the low capacity mode, the pump 631 can be configured to operate at the large displacement setting. When the rear differential assembly 622 is in the high capacity mode, the pump 631 can be configured to operate at the small displacement setting (wherein the small displacement setting provides smaller fluid displacement than does the large displacement setting). Each of the low capacity mode and the high capacity mode can provide variable levels of output torque from zero to a maximum value by varying the speed of the motor 636 (and thus, the pressure output of the pump 631) from zero to its maximum speed.

The full low capacity mode and the full high capacity mode of the rear differential assembly 622 can "lock" the rear driveshafts 24L, 24R to the intermediate shaft 458 so that differential speed between the rear driveshafts 24L, 24R can be prohibited or substantially prohibited. The rear differential assembly 622 can be configured in the full low capacity mode when the pump 631 is configured in the large displacement setting and the motor 636 is operated at its maximum speed. The rear differential assembly 622 can be configured in the full high capacity mode when the pump 631 is configured in the small displacement setting and the motor 636 is operated at its maximum speed.

The rear differential assembly 622 also can include a differential housing 652. The differential housing 652 can contain all, or any combination, of the above mentioned components of the rear differential assembly 622.

Operation of the two-speed final drive assembly 30, the power-take-off assembly 32 and the rear differential assembly 622 (both automatic and manual) will now be described with reference to FIGS. 3-6.

Figure 3:
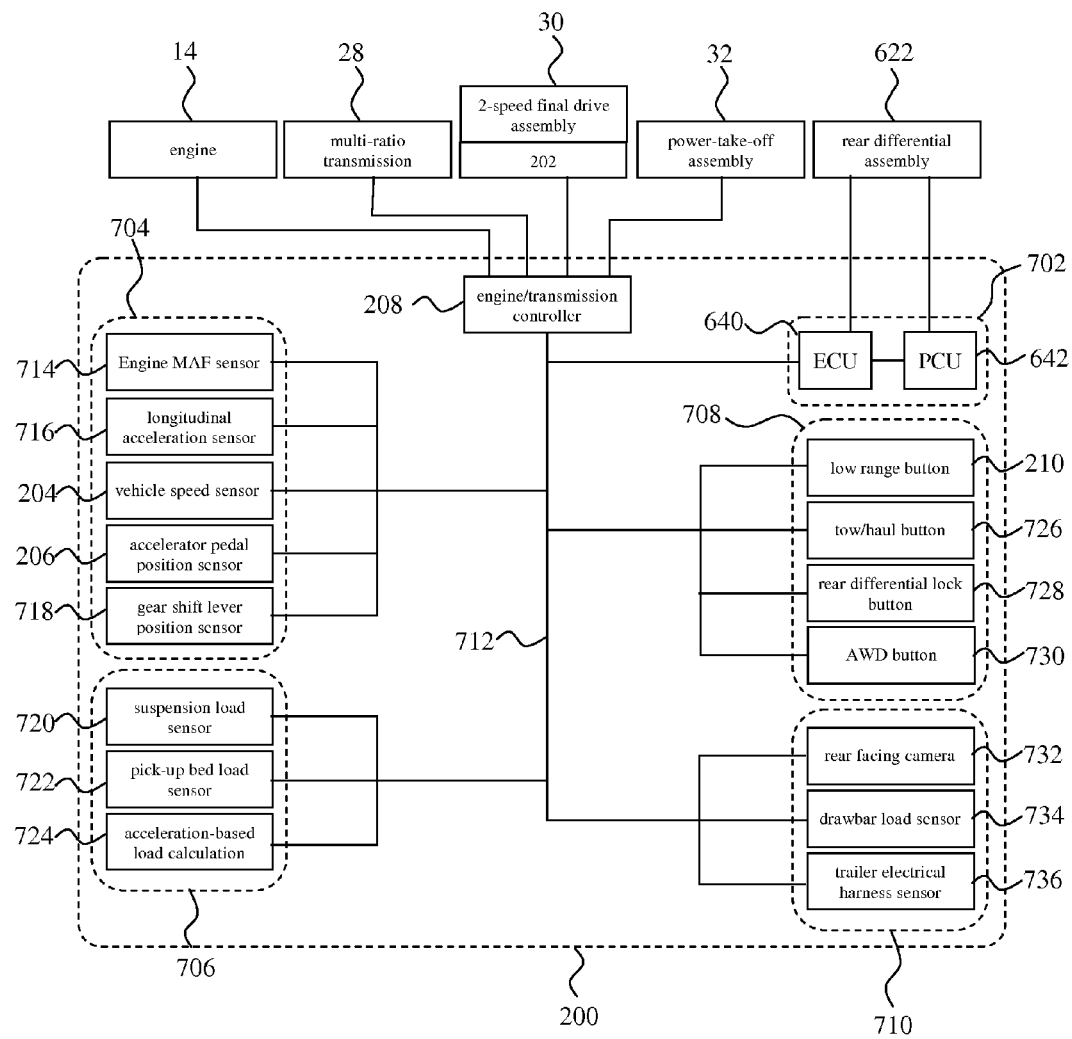
FIG. 3 is a block diagram of a control system that can permit automatic or manual operation of various components of the powertrain of FIG. 1.

FIG. 3 is a schematic representation of the hardware components of a control system 200 for manipulating the two-speed final drive assembly 30, the power-take-off assembly 32 and the rear differential assembly 622. The control system 200 can operate these assemblies 30, 32, 622 automatically or as a result of manual input from the operator of the vehicle 10.

The control system 200 can be in electrical communication with each of the internal combustion engine 14, the multi-ratio transmission 28, the two-speed final drive assembly 30, the power-take-off assembly 32 and the rear differential assembly 622. Any electrical communication described herein can be one-way communication or two-way communication. The control system 200 can include an engine/transmission controller 208, a rear differential controller 702, an input array and a controller area network (CAN) 712.

The input array can include at least one sensor and at least one switch, where the switch(es) is/are accessible by the operator of the vehicle 10. In the exemplary embodiment represented by FIG. 2, the input array can include a vehicle dynamics array 704, a vehicle load detection array 706, a manual override array 708 and a trailer detection array 710. The data from the vehicle dynamics array 704 can indicate at least one dynamic condition of the vehicle 10. The data from the vehicle load detection array 706 can be indicative of at least one static condition of the vehicle 10, such as, but not limited to, a cargo load applied to the vehicle 10. The manual override array 708 can indicate manual input from the operator of the vehicle 10. The trailer detection array 710 can indicate the status of a trailer connected to the vehicle 10, which is another static condition of the vehicle 10. The data from the input array can be processed by either one of, or both of, the controllers 208, 702 to manipulate the two-speed final drive assembly 30, the power-take-off assembly 32 and/or the rear differential assembly 622.

The engine/transmission controller 208 and the rear differential controller 702 each can be referred to as an electronic control unit (ECU) or as a central processing unit (CPU). Each ECU referred to herein can be configured with hardware alone, or to run software, that permits the ECU to send, receive, process and store data and to electrically communicate with sensors, manual switches, actuators and/or other ECUs via the CAN 712.

The engine/transmission ECU 208 can be in electrical communication with the rear differential controller 702 and any single one of, or any combination of, the arrays 704, 706, 708, 710 across the CAN 712 in any manner known in the art. The engine/transmission ECU 208 also can be in electrical communication with any single one of, or any combination of the engine 14, the multi-ratio transmission 28, the two-speed final drive assembly 30, and the power-take-off assembly 32 across the CAN 712 in any manner known in the art.

The rear differential ECU 702 can be in electrical communication with the engine/transmission controller 208, the rear differential assembly 622 and any single one of, or any combination of, the arrays 704, 706, 708, 710 across the CAN 712 in any manner known in the art.

The engine/transmission ECU 208 can be in electrical communication with the rear differential assembly 622 via the rear differential ECU 702. In alternate embodiments, the engine/transmission ECU 208 can be connected to the rear differential assembly 622 for direct electrical communication, or the engine/transmission ECU 208 can be isolated from electrical communication with the rear differential assembly 622.

When data is communicated only to the engine/transmission ECU 208 from any of the arrays 704, 706, 708, 710, the engine/transmission ECU 208 either can pass the raw data to the rear differential ECU 702 for processing by the rear differential ECU 702. Alternatively, the engine/transmission ECU 208 can process the raw data from all of the arrays 704, 706, 708, 710 and pass instructions based on the processed data to the rear differential ECU 702. Further, the engine/transmission ECU 208 can process the raw data from all of the arrays 704, 706, 708, 710 and pass the processed results to the rear differential ECU 702 such that the rear differential ECU 702 creates and issues instructions based on the processed results.

The rear differential controller 702 can manipulate the speed of the motor 636 (FIG. 2), the displacement of the on-demand variable displacement pump 631, and the position of the purge valve 632. The rear differential controller 702 can include a controller 640 and a pump control unit (PCU) 642. The controller 640 and the PCU 642 also can be referred to as an ECU or as a CPU. In this exemplary embodiment, the PCU 642 can be subordinate to the ECU 640. That is, the ECU 640 can receive instructions from the engine/transmission ECU 208 and signal the purge valve 632 and the PCU 642, accordingly. The PCU 642 can signal the motor speed to the motor 636 (FIG. 2) and can signal the displacement position (i.e., low or high) for the on-demand variable displacement pump 631. The rear differential controller 702 also can include input from a pressure sensor (not illustrated) and position data from the pump 631 and the purge valve 632. The above-referenced co-pending U.S. patent application Ser. No. 12/847,786, entitled "Hydraulic Vehicle Clutch System, Drivetrain for a Vehicle Including Same, and Method", discloses exemplary embodiments of software and hardware that can be employed by the rear differential controller 702 to regulate the motor 636 and the pump 631. In an alternate embodiment, the ECU 640 and the pump control unit 642 can be integrated into a single ECU.

In other alternate embodiments, the PCU 642 can be eliminated and the ECU 640 can control the appropriate components of the rear differential assembly 622. In another alternate embodiment, the ECU 640 can receive data directly from the input array via the CAN 712 and can then produce control signals based on the input data, without any signal from the engine/transmission ECU 208. In yet another alternate embodiment, the PCU 642 can be limited to only signaling the displacement setting (i.e., low or high) to the on-demand variable displacement pump 631, while the ECU 640 produces and issues all of the other necessary control signals.

The vehicle dynamics array 704, the vehicle load detection array 706 and the trailer detection array 710 can provide data to at least one of the ECUs 208, 702 that can indicate the real-time dynamic and static conditions of the vehicle 10 and the target performance of the vehicle 10 desired by the operator of the vehicle 10. This data can be processed by at least one of the ECUs 208, 702 to determine a selection for each of the two-speed final drive assembly 30, the power-take-off assembly 32 and the rear differential assembly 622 that can provide an advantageous and automatic adjustment to the dynamics of the vehicle 10 so that the intention of the operator of the vehicle 10 can be met at close as is permissible.

The vehicle dynamics array 704 can provide data to at least one of the ECUs 208, 702 that indicates whether the actual speed of the vehicle 10 corresponds to a speed targeted by the operator of the vehicle 10 through an accelerator pedal (not shown) and a transmission gear selector (not shown). The vehicle load detection array 706 and the trailer detection array 710 can provide at least one of the ECUs 208, 702 with data that indicates an increase in rear wheel traction potential due to additional weight applied to the rear wheels 26L, 26R by cargo and/or a trailer, respectively. The data from these two arrays 706, 710 can be used to refine control of the rear differential assembly 622 and/or the two-speed final drive assembly 30 to take advantage of the increase in potential traction at the rear wheels 26L, 26R. Further details of the processing performed by the engine/transmission ECU 208 and/or the rear differential ECU 702 will be described below with respect to FIGS. 4-6.

The vehicle dynamics array 704 can include an engine mass airflow (MAF) sensor 714, a longitudinal acceleration sensor 716, a vehicle speed sensor 204, an accelerator pedal position sensor 206, and a gear shift lever position sensor 718. Each of the sensors 204, 206, 714, 716, 718 can be any appropriate type of sensor known in the art and in electrical communication with the at least one of the ECUs 208, 702 via the CAN 712 to provide data to at least one of the ECUs 208, 702 in any manner known in the art.

The vehicle load detection array 706 can include a suspension load sensor 720. The suspension load sensor 720 can detect a static load applied to a particular suspension component (not shown) of the vehicle 10 by an item or items placed in or on the vehicle 10. The suspension load sensor 720 can measure the actual load applied by the cargo to the suspension component or the suspension load sensor 720 could merely sense that the suspension component has been displaced by a cargo load, as opposed to motion of the vehicle 10. If the suspension load sensor 720 measures the actual load applied to suspension component, this sensor 720 could signal one or both of the ECUs 208, 702 whether the applied load exceeds a threshold value or this sensor could signal the actual sensed load to the appropriate ECU 208, 702.

When the vehicle 10 is configured as a pick-up truck, the vehicle load detection array 706 also can include a pick-up bed load sensor 722. When the vehicle 10 is not configured as a pick-up truck, the pick-up bed load sensor 722 can be omitted or it can be used to sense the load in the trunk or other cargo area of the vehicle 10, such as behind the last row of seats in a minivan or sport-utility vehicle (SUV). Like the suspension load sensor 720, sensor 722 can measure the actual load or merely the presence of a load in a particular location and signal the appropriate data to the appropriate ECU 208, 702.

The data from these sensors 720, 722 can be used by one or both of the ECUs 208, 702 to determine where (e.g., front, middle, rear) on the vehicle 10 the cargo load is placed. For example, a cargo load place at or near the rear wheels 24L, 24R can be advantageous to the manipulation of the rear differential assembly 622 whereas, a cargo load applied away from the rear wheels 24L, 24R might not justify precise control or small torque capacity settings of the rear differential assembly 622. Each of the sensors 720, 722 can be any appropriate type of sensor known in the art and can be in electrical communication with at least one of the ECUs 208, 702 via the CAN 712 to provide data to at least one of the ECUs 208, 702 in any manner known in the art.

The vehicle load detection array 706 also can be configured with hardware alone or with software, to perform an acceleration-based load calculation 724. The acceleration-based load calculation 724 can be a function of weight, load, throttle setting, change in wheel speed with respect to time, and resulting longitudinal acceleration. This calculation can be carried out within the vehicle load detection array 706 by either, or both, of the sensors 720, 722, or by a dedicated processor (not illustrated). This calculation can also be carried out by at least one of the ECUs 208, 702.

The manual switch array 708 can include a plurality of individual switches that can permit the operator of the vehicle 10 to manually override automatic control of the two-speed final drive assembly 30, the power-take-off assembly 32 and the rear differential assembly 622 by the engine/transmission ECU 208 and/or the rear differential ECU 702. The manual switch array 708 can be positioned in the passenger compartment of the vehicle within reach of the operator of the vehicle 10. The manual switch array 708 can include a low range button 210, a tow/haul button 726, a rear differential lock button 728 and/or an AWD button 730. Each of the buttons 210, 726, 728, 730 can be any appropriate type of manual electrical switch known in the art and can be in electrical communication with at least one of the ECUs 208, 702 via the CAN 712 to provide data to at least one of the ECUs 208, 702 in any manner known in the art.

Actuation of the low range button 210 by the operator of the vehicle 10 can signal the engine/transmission ECU 208 to select and cause engagement of the low range gearing in the two-speed final drive assembly 30 and can signal the rear differential ECU 702 to modulate the rear clutches 610, 612 in a particular manner. Actuation by the operator of the vehicle 10 of the tow/haul button 726 can signal at least one of the ECUs 208, 702 to modulate the rear clutches 610, 612 in a manner that can be advantageous while towing a trailer or carrying a load in the pick-up bed (or other cargo area). Actuation of the rear differential lock button 728 by the operator of the vehicle 10 can signal at least one of the ECUs 208, 702 to place the rear differential assembly 622 into either the full low capacity mode or the full high capacity mode. Actuation of the AWD button 730 by the operator of the vehicle 10 can signal at least one of the ECUs 208, 702 to engage the power-take-off clutch 446 and the rear clutches 610, 612 to convert the drivetrain 422 from the FWD mode to the AWD mode.

The trailer load detection array 710 can be optional and can be included when the vehicle 10 is equipped to tow a trailer. The trailer detection array 710 can include, for example, a rear facing camera 732, a drawbar load sensor 734 and a trailer harness sensor 736. The rear facing camera 732 can be any optical camera known in the art. For example, the rear facing camera 732 can be a component of separate driver assist system, such as a rearview monitoring system and can comprise a CCD array type digital camera. The drawbar load sensor 734 can detect the actual load applied by a trailer (or other load) to the drawbar (not shown) of the vehicle 10 and send the appropriate signal to at least one of the ECUs 208, 702. Alternatively, the drawbar load sensor 734 can be an ON/OFF type sensor that merely detects the presence or the absence of a load on the drawbar, without actual measurement of the load applied to the drawbar. The trailer harness sensor 736 can detect and indicate the presence of a trailer wire harness (not shown) in electrical communication with the electrical system (not shown) of the vehicle 10.

Each of the switches 210, 726, 728, 730 can be configured with hardware alone or with software, to assign a value based on the position (ON or OFF) of the respective switch 210, 726, 728, 730. Alternatively, each switch 210, 726, 728, 730 can provide raw data to at least one of the ECUs 208, 702 and the appropriate ECU 208, 702 can be provided with hardware alone or with software, to process the raw data into a value usable by the appropriate ECU 208, 702. Also, the switches 210, 726, 728, 730 can provide the value (or raw data) with or without a prompt from the appropriate ECU 208, 702. And, the value (or raw data) from each switch 210, 726, 728, 730 can be stored in an electronic memory component external to, or internal to, any single one of, or any combination of the switches 210, 726, 728, 730 and the ECUs 208, 702 until needed by the appropriate ECU 208, 702.

Similarly, each of the sensors, 204, 206, 714, 716, 718, 720, 722, 732, 734, 736 can be configured with hardware alone or with software, to process the sensed data and send the processed data to at least one of the ECUs 208, 702. Each of the sensors 204, 206, 714, 716, 718, 720, 722, 732, 734, 736 can provide raw data to at least one of the ECUs 208, 702 and the appropriate ECU 208, 702 can be provided with hardware alone or with software to process the raw data into a value usable by the appropriate ECU 208, 702. Also, the sensors 204, 206, 714, 716, 718, 720, 722, 732, 734, 736 can provide the data (processed or raw) with or without a prompt from the appropriate ECU 208, 702. The data (processed or raw) from each switch 210, 726, 728, 730 can be stored in an electronic memory component external to, or internal to, any single one of, or any combination of the sensors 204, 206, 714, 716, 718, 720, 722, 732, 734, 736 and the ECUs 208, 702 until needed by the appropriate ECU 208, 702.

The control system 200 can also include the actuator 202 for the two-speed final drive assembly 30. The actuator 202 can be in electrical communication with the engine/transmission ECU 208. The actuator 202 can include any known actuator, such as an electrical actuator, a magnetic actuator, an electro-mechanical actuator, an electro-magnetic-mechanical actuator or an electro-hydraulic actuator. The actuator 202 can be coupled to a clutch (not shown) or other known torque transmission coupling device. The clutch can cause engagement of the selected one of the low range drive ratio and the high range drive ratio in series with a selected one of the reverse drive ratio and the plurality of forward drive ratios. The actuator 202 can be a component of the two-speed final drive assembly 30 and at least the clutch can be mounted within the housing 36, as is disclosed in the above-referenced co-pending U.S. patent application Ser. No. 12/847,639, entitled "Transversely Mounted Transaxle Having a Low Range Gear Assembly and Powertrain for a Vehicle Including Same".

The control system 200 can also include the actuation devices 618, 619, the on-demand variable displacement pump 631, the purge valve 632, the reservoir 634, the motor 636 and the fluid lines of the rear differential assembly 622.

Figure 4:
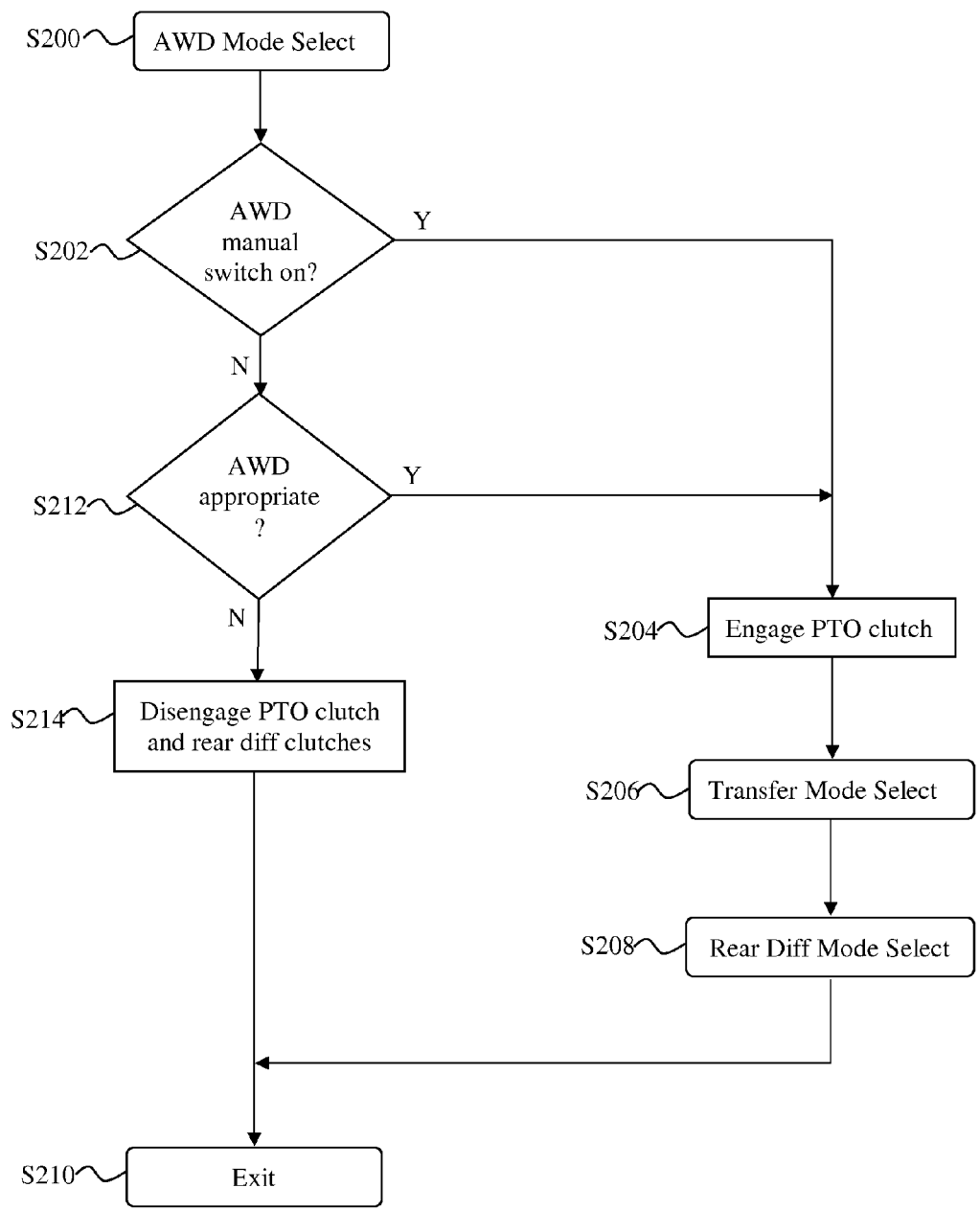
FIG. 4 is a flowchart representative of an algorithm useable by the control system of FIG. 3.
Figure 5:
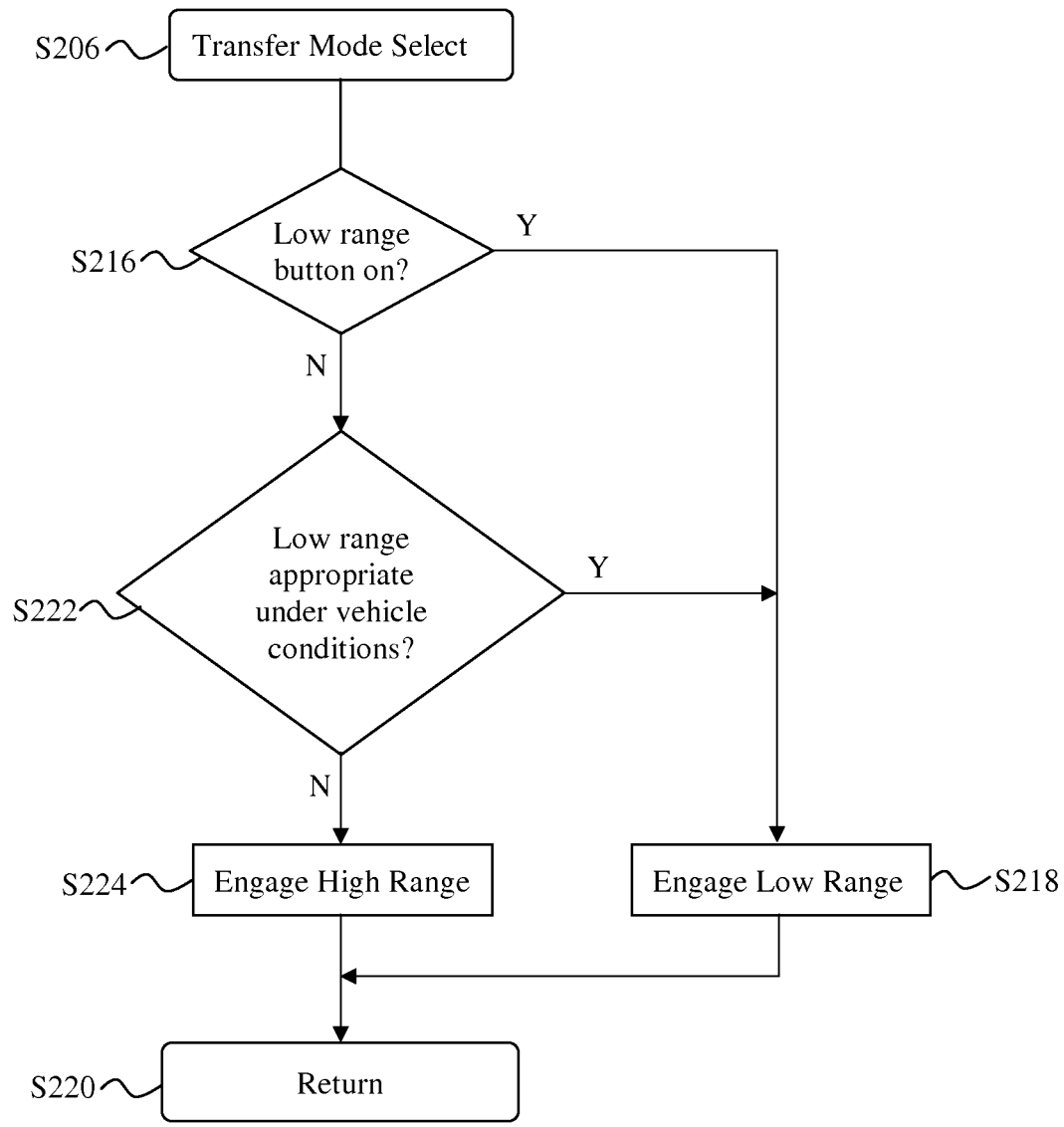
FIG. 5 is a flowchart representative of a subroutine useable in the algorithm of FIG. 4.

The operation of the control system 200 will now be described with reference to FIGS. 4-6. The subroutines based on the flowcharts depicted in FIG. 4-6 can be built into the hardware of one or both of the engine/transmission ECU 208 and the rear differential ECU 702 or executed as software by one or both of the ECUs 208, 702. If both ECUs 208, 702 contain these subroutines, then one ECU can be a primary ECU and the other ECU can be a subordinate ECU to the primary ECU. In this scenario, the subordinate ECU could also be configured to provide redundancy if the primary ECU fails or malfunctions. In another embodiment, the engine/transmission ECU 208 can operate in concert with the rear differential ECU 702 to manipulate any single one of, or any combination of, the two-speed final drive assembly 30, the power-take-off assembly 32 and the rear differential assembly 622. These subroutines can permit automatic manipulation, without direct input from the driver, of any single one of, or any combination of, the two-speed final drive assembly 30, the power-take-off assembly 32 and the rear differential assembly 622. These subroutines can also permit the operator of the vehicle 10 to manually override one or both of the ECUs 208, 702 to directly manipulate the two-speed final drive assembly 30, the power-take-off assembly 32 and the rear differential assembly 622, singly or in any combination. For the purpose of the following discussion, the engine/transmission ECU 208 is considered a primary ECU and the rear differential ECU 702 is considered a subordinate ECU to the primary ECU.

The AWD mode select subroutine can begin at step S200. In this subroutine, the ECU 208 can determine whether the vehicle 10 should be configured in the FWD mode or the AWD mode. If the ECU 208 determines that the vehicle 10 should be configured in the FWD mode, then the subroutine guides the ECU 208 in its manipulation of the two-speed final drive assembly 30 and the rear differential assembly 622 (via the rear differential ECU 702) so that the components mentioned above can be rotationally isolated from the engine 14 and the rear driveshafts 24L, 24R. If the ECU 208 determines that the vehicle 10 should be configured in the AWD mode, then the subroutine can guide the ECU 208 in its manipulation of the two-speed final drive assembly 30 and the rear differential assembly 622 (via the rear differential ECU 702) to cause engagement of the power-take-off clutch 446 and the rear clutches 610, 612.

At step S202, the ECU 208 can determine if the operator of the vehicle 10 has by-passed automatic selection of the AWD mode. That is, at step S202, the ECU 208 can determine if the operator has manually engaged any of the low range button 210, the tow/haul button 726, the rear differential lock button 728 and the AWD button 730. If any one of these buttons 210, 726, 728, 730 is placed in the ON position, then the ECU 208 can proceed to step S204. In step S204, the ECU 208 can signal the power-take-off clutch 446 to couple the intermediate gear 134 to the input gear 130. Thus, power from the engine 14 can be routed to the rear differential assembly 622 to configure the drivetrain 422 in the AWD mode, in accordance with the operator's instructions.

The ECU 208 then can proceed to step S206 of the subroutine where the ECU 208 can enter the transfer mode select subroutine. In the transfer mode select subroutine, the ECU 208 can determine which of the low range gearing and the high range gearing to engage. Details of the transfer mode select subroutine will be discussed below with reference to FIG. 5.

After completing the transfer mode select subroutine, the ECU 208 then can proceed to step S208 of the subroutine where the ECU 208 enters the rear differential mode select subroutine. In the rear differential mode select subroutine, the ECU 208 can signal the rear differential ECU 702 to determine the appropriate displacement setting for the on-demand variable displacement pump 631, the position of the purge valve 632 and the speed of the motor 636. Details of the rear differential mode select subroutine will be discussed below with reference to FIG. 6.

After completing the rear differential mode select subroutine, the ECU 208 can then proceed to step S210 where the ECU 208 exits the AWD mode select subroutine.

If at step S202, the ECU 208 determines that all of the manual buttons 210, 726, 728, 730 are not in the ON position (i.e., in the OFF position), then the ECU 208 can proceed to step S212. At step S212, the ECU 208 can determine if automatic selection of the AWD mode is appropriate. Any conditions of the vehicle 10 (including, but not limited to, conditions associated with data from an input array) and the terrain can be input to the ECU 208 and processed by the ECU during step S212 in any manner known in the art. Exemplary variables can include, but are not limited to, steering angle, accelerator pedal position, brake pedal position, engine torque, gear selection, vehicle acceleration (longitudinal, lateral and yaw rate), wheel speed of each wheel, vehicle angle of inclination, and ambient temperature. The ECU 208 also can execute, at this step S212, any one of, or any combination of, the exemplary evaluations that can be executed by the ECU 208 when following the subroutines to be described below with reference to FIGS. 5 and 6. However, other evaluations can be executed in place of or in addition to any one of, or any combination of, the executions of FIGS. 5 and 6.

If the ECU 208 determines at step S212 that the AWD mode is appropriate, then the ECU 208 can proceed to steps S204 through S210, as described above. Thus, the ECU 208 can automatically cause the drivetrain 422 to be configured in the AWD mode. In addition, when the ECU 208 determines at step S212 that the AWD mode is appropriate, the ECU 208 can be configured to cause the actuator 202 to engage the high range final drive ratio. The high range final drive ratio can be advantageous under many static and/or dynamic conditions of the vehicle 10 when in the FWD mode. However, there also may be conditions (static and/or dynamic) where the low range final drive ratio can be advantageous when in the FWD mode, and the ECU 208 can be configured to also make this determination at step S212.

If the ECU 208 determines at step S212 that the AWD mode is not appropriate, then the ECU 208 can proceed to step S214. At step S214, the ECU 208 can signal the power-take-off clutch 446 to disengage the intermediate gear 134 from the input gear 130 and the ECU 208 can signal the rear differential ECU 702 to disengage the rear clutches 610, 612. Thus, the ECU 208 automatically causes the drivetrain 422 to be configured in the FWD mode with the components mentioned above rotationally isolated from the engine 14 and the rear wheels 26L, 26R. It should be understood that, although each of the above (and below) portions of the routines/subroutines may be described as a "step", this description should not be interpreted as a requirement that the steps be sequential in their order of appearance (although they can be), or somehow prioritized in their order.

In an alternate embodiment of the subroutine, step S214 can omit the execution by the ECU 208 of a signal to the rear differential ECU 702 to disengage the rear clutches 610, 612. Thus, the above-mentioned components can be rotationally isolated from the engine 14 but can remain rotationally coupled to the rear driveshafts 24L, 24R.

As mentioned above, the ECU 208 can enter the transfer mode select subroutine at step S206. As shown in FIG. 5, the ECU 208 can move to step S216 where the ECU 208 determines if the operator of the vehicle 10 has by-passed the automatic selection of the low range drive ratio and the high range drive ratio via the low range button 210. That is, at step S216, the ECU 208 can determine if the driver has manually selected the low range drive ratio (i.e., the low range button 210 is in the ON position).

If the low range button 210 is placed in the ON position, then the subroutine can proceed to step S218. In step S218, the ECU 208 can signal the actuator 202 to select the low range drive ratio, in accordance with the vehicle operator's instruction. The ECU 208 then can proceed to step S220 of the subroutine where the ECU 208 can return to the AWD mode select subroutine and begin the rear differential mode select subroutine at step S208 of FIG. 4.

Alternatively, if the low range button 210 is activated by the operator of the vehicle 10, the ECU 208 can follow another subroutine where the ECU 208 can determine if it is not advantageous to permit manual engagement. Additionally, or alternatively, the ECU 208 can be configured to determine whether to disengage the low range drive ratio after it has been directly selected by the driver via the manual override switch 210.

The selection of the low range drive ratio can be carried to another subroutine where a decision can be made by the ECU 208 whether to signal the actuator 202 to move to the low range position. For example, the ECU 208 can be configured to collect data indicating the current position of the actuator 202 and comparing the current position to the position corresponding to the selection made at step S218.

Also, as part of step S218 or just prior to step S218 or subsequent to step S218, the ECU 208 can be configured to compare other vehicle parameters before signaling the actuator 202 to move to the low range position. Examples of these parameters can include any of, but are not limited to, engine output torque, engine intake air flow, fuel flow, transmission output torque, transmission output speed, transmission gear selection, input speed of the power-take-off assembly 32, output speed of the power-take-off assembly 32, status of torque distribution in the rear differential assembly 622, position of the AWD button 730, vehicle inclination angle, vehicle load distribution, brake pedal position, and trailer detection signals. At any time, in the event that the ECU 208 determines an unsafe or undesired condition, a switch to low range (or back to high range) can be prevented by either the ECU 208 or by a mechanical safety limiting device or devices. The ECU 208 can work either alone or in combination with the mechanical safety limiting device(s) to prevent the transmission from switching between the low and high range positions.

Above-referenced co-pending U.S. patent application Ser. No. 12/847,673, entitled "Control System and Method for Automatic Selection of a Low Range Gear Ratio for a Vehicle Drivetrain", discloses additional exemplary subroutine steps that the ECU 208 can perform when determining the appropriateness of signaling the actuator 202 to engage the low range gearing in response to the operator of the vehicle 10 actuating the low range button to the ON position.

If the ECU 208 determines at step S216 that the low range button 210 is not selected (i.e., placed in the OFF position), then the control system 200 can operate in its automatic mode for selecting an appropriate one of the low range drive ratio and the high range drive ratio. The ECU 208 can proceed to step S222 of the subroutine which is useful for shift-on-the-fly capability for the control system 200.

At step S222, the ECU 208 can compare data from the vehicle dynamics array 704 representing the real-time vehicle dynamic conditions of the vehicle 10 to values representing threshold conditions that can be appropriate for engagement of the low range gearing. The real-time dynamic conditions and threshold conditions can include, but are not limited to, mass air flow in the engine intake, vehicle acceleration, vehicle speed, accelerator pedal position and gear shift lever position. Above-referenced co-pending U.S. patent application Ser. No. 12/847,673, entitled "Control System and Method for Automatic Selection of a Low Range Gear Ratio for a Vehicle Drivetrain", discloses exemplary subroutine steps that the ECU 208 can perform when determining the appropriateness of an automated shift to, or from, the low range gearing.

If the ECU 208 determines at step S222 that low range gearing is appropriate, then the ECU 208 can proceed to step S218 where the ECU 208 signals the actuator 202 to engage the low range gearing, as discussed above. If the ECU 208 determines at step S222 that the low range gearing is not appropriate, then the ECU 208 can move to step S224. At step S224, the ECU 208 signals the actuator 202 to engage (or remain in) the high range gearing.

Upon completion of either step S218 or step S224, the ECU 208 can proceed to step S220 and return to the AWD mode select subroutine at step S208. At step S208, the ECU 208 enters the rear differential mode select subroutine and determines in which mode (high capacity, low capacity, full low capacity, full high capacity) to operate the rear differential assembly 622. FIG. 6 illustrates an exemplary flowchart that details steps that can be performed by the ECU 208 when following this subroutine.

Figure 6:
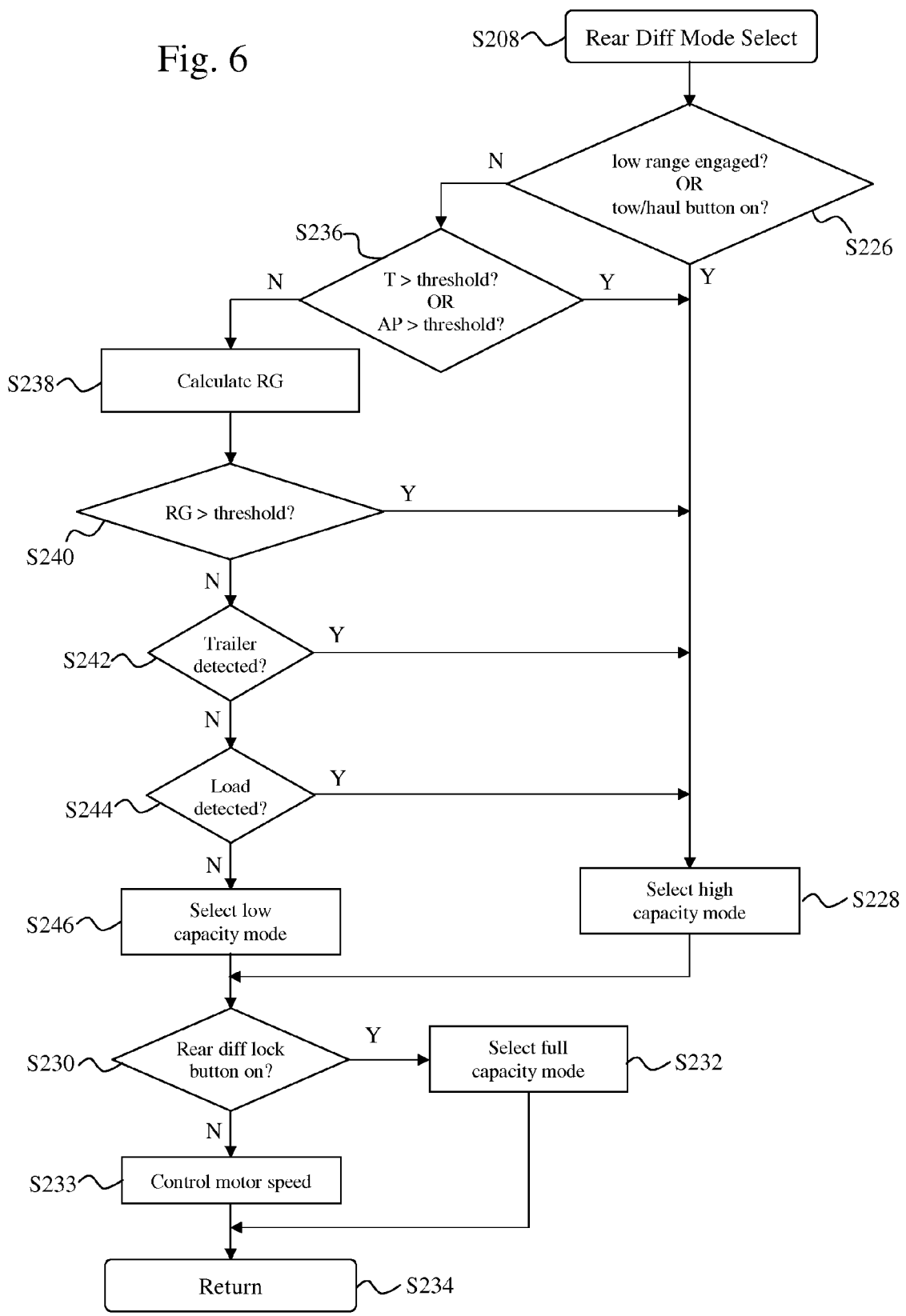
FIG. 6 is flowchart representative of a subroutine useable in the algorithm of FIG. 4.

After entering the rear differential mode select subroutine at step S208, the ECU 208 can proceed to step S226 of the exemplary subroutine illustrated in FIG. 6. At step S226, the ECU 208 can determine whether the low range final drive ratio is engaged (either automatically or via the low range button 210) or the tow/haul button 726 is in the ON position. If the low range final drive ratio is engaged or if the tow/haul button 726 signals the ECU 208 that it is in the ON position, then the ECU 208 can proceed to step S228.

At step S228, the ECU 208 can select the high capacity mode for the rear differential assembly 622. As discussed above, the high capacity mode can be advantageous when the low range final drive ratio is engaged because the high capacity mode can successfully transmit the substantially increased torque produced by the low range final drive assembly. Also as discussed above, the ON position of the tow/haul button 726 can be indicative that there is an increased load on the rear wheels 26L, 26R such that an increase in torque transmitted to the rear wheels 26L, 26R via the high capacity mode can be advantageous. The ECU 208 can then signal the rear differential ECU 702 to place the on-demand variable displacement pump 631 in the low displacement setting. The ECU 208 can then proceed to step S230.

At step S230, the ECU 208 can determine whether the rear differential assembly 622 should be operated in the full high capacity mode. If the rear differential lock button 728 signals the ECU 208 that it is in the ON position, then the ECU 208 can proceed to step S232. At step S232, the ECU 208 can signal the rear differential ECU 702 to operate the rear differential assembly 622 in the full high capacity mode. Then the ECU 208 can proceed to step S234 where the ECU 208 can return to the AWD mode select subroutine subsequent to step S208. Upon returning to the AWD mode select subroutine, the ECU 208 can proceed to step S210 and can exit the AWD mode select subroutine.

If the rear differential lock button 728 signals the ECU 208 that it is in the OFF position, then the ECU 208 can proceed to step S233. With or without further input from the ECU 208, the rear differential ECU 702 can modulate, at step S233, the speed of the motor 636 according to signal(s) input from any of the sensor arrays 704, 706, 710. By modulating the speed of the motor 636, the ECU 702 can vary the amount of torque transmitted to each of the rear clutches 610, 612 in a manner that is known in the art. Alternatively, above-referenced co-pending U.S. patent application Ser. No. 12/847,786, entitled "Hydraulic Vehicle Clutch System, Drivetrain for a Vehicle Including Same, and Method" discloses exemplary subroutines that can enable the rear differential ECU 702 to perform this modulation. The ECU 208 can then proceed to step S234 and return to the AWD mode select subroutine, as described above.

If both of the low range button 210 and the tow/haul button 726 signal the ECU 208 that they are not in the ON position (i.e., in the OFF position), then the ECU 208 can move from step S226 to step S236. At step S236, the ECU 208 can begin the process for automatically selecting either the low capacity mode or the high capacity mode based on real-time dynamic and static conditions of the vehicle 10. The real-time dynamic conditions can include, but are not limited to, engine torque, accelerator pedal position, and road grade. The real-time static conditions can include, but are not limited to, presence of a trailer, load on a drawbar of the vehicle 10, cargo load and cargo position (e.g., front, middle, rear). The sensor arrays 704, 706, 710 can detect the real-time vehicle conditions and send them to the ECU 208. The sensor arrays 704, 706, 710 can be modified by adding, removing or replacing sensors in order to detect the desired real-time conditions.

In this exemplary embodiment, the real-time engine torque T and the real-time accelerator pedal position AP can be indicators useful for the ECU 208 to determine whether to select the low capacity mode or the high capacity mode for the rear differential assembly 622. That is, if the engine torque T is greater than a threshold value, then the engine torque T could exceed the frictional capacity of the rear clutches 610, 612 if the rear differential assembly 622 is placed in the low capacity mode. This disparity could negate any advantage obtained by switching the drivetrain 422 from the FWD mode to the AWD mode, or could negate any advantage obtained by engaging the low range gearing in the two-speed final drive assembly 30. Conversely, if the engine torque T is below the threshold value then the low capacity mode might be sufficient. The real-time accelerator pedal position AP could be used by the ECU 208 to indicate an impending engine torque value that could exceed the frictional capacity of the rear clutches 610, 612 if the rear differential assembly 622 is placed in the low capacity mode. Conversely, the real-time accelerator pedal position AP could be used by the ECU 208 to indicate an impending engine torque value that might be sufficient for the low capacity mode.

The ECU 208 can process signals from the engine MAF sensor 714 and the accelerator pedal position sensor 206 to calculate the engine torque value T and to obtain the real-time position AP of the accelerator pedal. The data from the engine MAF sensor 714 and the accelerator pedal position sensor 206 can be used by the ECU 208 to automatically select the high capacity mode over the low capacity mode. In this exemplary embodiment, the ECU 208 can compare each of the sensed values to a respective threshold value. If the either the engine torque value T or the pedal position AP is greater than the respective threshold value, then the high capacity mode of the rear differential assembly 622 can be advantageous over the low capacity mode and the ECU 208 can proceed to step S228, step S230, optionally step S232 or step S233, and then to step S234, as described above.

However, if both the engine torque value T and the real-time accelerator pedal position AP are less than their respective threshold values, then the low capacity mode of the rear differential assembly 622 might be advantageous over the high capacity mode. In this case, the ECU 208 can continue the automatic selection process at step S238. At step S238, the ECU 208 can calculate a road grade value RG based on data from at least one of the longitudinal acceleration sensor 716 and the vehicle speed sensor 204. Other sensors, in place of or in addition to these sensors 204, 716, can be used for this calculation. The following equation can represent an exemplary calculation of the road grade value RG, which can be back-calculated from throttle angle and resulting acceleration vs. a table of values for flat road. The road grade value RG can indicate to the ECU 208 that the high capacity mode of the rear differential assembly 622 can be advantageous over the low capacity mode due to the grade (i.e., steepness or inclination or slope) of the road/terrain on which the vehicle 10 is currently traveling or about to traverse.

After calculating the road grade value RG, the ECU 208 can proceed to step S240. Here, the ECU 208 can compare the road grade value RG to a threshold value. If the road grade value RG is greater than the threshold value, then high capacity mode of the rear differential assembly 622 can be advantageous over the low capacity mode and the ECU 208 can proceed to step S228, step S230, optionally step S232 or step S233, and then to step S234, as described above.

If the road grade value RG is less than or equal to the threshold value, then low capacity mode of the rear differential assembly 622 still might be advantageous over the high capacity mode and the ECU 208 can proceed to step S242. At step S242, the ECU 208 can determine whether or not the vehicle 10 is towing a trailer. The high capacity mode of the rear differential assembly 622 can be advantageous over the low capacity mode when towing a trailer because the trailer can increase the traction between each of the rear wheels 26L, 26R and the road/terrain on which the vehicle 10 is traveling. Any single one of, or any combination of the sensors 732, 734, 736 of the trailer detection array 710 can provide the ECU 208 with the data usable to make this determination. Other sensors, in place of or in addition to these sensors 732, 734, 736, can be used for this calculation. If the ECU 208 determines at step S242 that a trailer has been detected by the trailer detection array 710, then the high capacity mode of the rear differential assembly 622 can be advantageous over the low capacity mode ECU can mode and the ECU 208 can proceed to step S228. The ECU 208 then can proceed to step S230, optionally step S232 or step S233, and then to step S234, as described above.

If the vehicle 10 is not towing a trailer, then the low capacity mode of the rear differential assembly 622 still might be advantageous over the high capacity mode and the ECU 208 can proceed to step S244. At step S244, the ECU 208 can determine whether the vehicle 10 is laden with cargo in the pick-up bed (if the vehicle 10 includes a cargo bed) and/or other area(s) of the vehicle 10. The high capacity mode of the rear differential assembly 622 can be advantageous over the low capacity mode when the vehicle 10 is laden with cargo because the cargo can increase the traction between each of the rear wheels 26L, 26R and the road/terrain on which the vehicle 10 is traveling.

Any single one of, or any combination of the sensors 720, 722 and the acceleration-based load calculation 724 of the vehicle load detection array 706 can provide the ECU 208 with the data usable to make this determination. Other sensors, in place of or in addition to these sensors 720, 722 and the calculation 724 can be used for this determination. If the ECU 208 determines at step S244 that an appropriate cargo load has been detected by the vehicle load detection array 706, then the high capacity mode of the rear differential assembly 622 can be advantageous over the low capacity mode ECU and the ECU 208 can proceed to step S228. The ECU 208 then can proceed to step S230, optionally step S232 or step S233, and then to step S234, as described above.

If the ECU 208 has determined that the high capacity mode of the rear differential assembly 622 is not advantageous over the low capacity mode in accordance with the above exemplary steps S236, S238, S240, S242, S244, then the ECU 208 can proceed to step S246. At step S246, the ECU 208 can signal the rear differential ECU 702 to operate the rear differential assembly 622 in the low capacity mode. The ECU 208 then can proceed to step S230, optionally step S232 or step S233, and then to step S234, as described above. Thus, the ECU 208, and the subordinate rear differential ECU 702 can control the selection of various components of the two-speed final drive assembly 30, the power-take-off assembly 32 and the rear differential assembly 622 either automatically or through manual input from the operator of the vehicle 10.

While certain embodiments of the invention are described above, it should be understood that the invention can be embodied and configured in many different ways without departing from the spirit and scope of the invention. For example, the engine/transmission ECU 208 can be replaced with a first ECU and a second ECU, where the first ECU can be limited to controlling the engine 14 and the multi-ratio transmission 28 only, and where the second ECU can be limited to controlling the two-speed final drive assembly 30, the power-take-off assembly 32 and/or the rear differential assembly 622 only. In this exemplary alternative, the second ECU can control any single one of, or any combination of, the assemblies 30, 32, 622, with or without the rear differential controller 702, in any manner described above.

In another exemplary embodiment of the disclosed subject matter, the CAN 712 can be replaced with any known electrical communication system, such as, other networked systems or simple electrical wiring without communication protocols.

In another exemplary embodiment, the power-take-off clutch 446 can be omitted along with the associated control subroutine for the ECU 208.

As disclosed in co-pending U.S. patent application Ser. No. 12/847,786, entitled "Hydraulic Vehicle Clutch System, Drivetrain for a Vehicle Including Same, and Method", each clutch 610, 612 can be coupled with a respective motor, pump and/or purge valve such that each clutch 610, 612 can be independently controlled in any manner disclosed in this co-pending U.S. patent application, or in any manner described above, or in any manner known in the art.

Although the vehicle 10 has been described with a front engine and front transmission layout, other layouts are possible. For example, the engine can be mounted near the front, middle or rear of the vehicle 10 and the transmission can be mounted near the front, middle or rear of the vehicle 10, as are known in the art. Also, the engine 14 and/or the transmission can be mounted in either a transverse orientation or a longitudinal orientation, as is known in the art.

The two-speed final drive assembly 30 and the power-take-off assembly 32 can be mounted in a transfer case separate from the multi-ratio transmission 28 and the front differential 42 assembly, as is known the art. In this alternate embodiment, an intermediate propeller shaft can extend from the multi-ratio transmission 28 to the transfer case, the propeller shaft 20 can extend from the transfer case to the rear differential assembly 622 and a front propeller shaft can extend from the transfer case to the front differential 42 assembly.

An additional pair of rear wheels, rear driveshafts and rear differential assembly can be mounted to the rear of the vehicle 10 and driven by the engine 14, the multi-ratio transmission 28, the two-speed final drive assembly 30, and the power-take-off assembly 32 and controlled by the ECUs 208, 702 in any manner described above.

Further, the order of steps S226, S236, S238, S240, S242, and S244 of the rear differential mode select subroutine can be executed by the ECU 208 in any order relative to one another. And, any of the steps S226, S236, S238, S240, S242, and S244 can be omitted, as desired.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A drivetrain for a vehicle comprising:
a multi-ratio transmission;
a two-speed final drive assembly connected in series with the multi-ratio transmission and including a low speed final drive ratio and a high speed final drive ratio;
a pair of front driveshafts driven by the two-speed final drive assembly;
a pair of rear driveshafts;
a rear differential assembly connected to the two-speed final drive assembly and including,
  a high capacity mode and a low capacity mode,
  an input member driven by the two-speed final drive assembly,
  first and second clutch assemblies selectively coupling the input member to a respective one of the pair of rear driveshafts, each of the clutch assemblies including,
    a plurality of driven plates connected to the input member, and
    a plurality of driving plates selectively engageable with the plurality of driven plates,
  first and second pistons each associated with a respective one of the first and second clutch assemblies, each of the first and second pistons configured to displace the plurality of driving plates into engagement with the plurality of driven plates,
  a variable displacement pump, and
  a purge valve, wherein the purge valve and at least one of the first and second pistons are in parallel fluid communication with the variable displacement pump; and
a control assembly including, a controller in electrical communication with the variable displacement pump and the purge valve, and an input array in electrical communication with the controller and including, a plurality of sensors, and at least one switch accessible to an operator of the vehicle.

2. The drivetrain of claim 1, wherein the controller is configured to:

select one of the low range final drive ratio and the high range drive ratio based on electrical communication from the input array;

operate the two-speed final drive assembly in the selected one of the low range drive ratio and the high range drive ratio;

select one of the high capacity mode and the low capacity mode based on electrical communication from the input array; and cause the rear differential assembly to operate in the selected one of the high capacity mode and the low capacity mode.

3. The drivetrain of claim 2, wherein each of the high capacity mode and the low capacity mode includes a full capacity mode.

4. The drivetrain of claim 3, wherein the controller is configured to select the high capacity mode when the two-speed final drive assembly is in the low range final drive ratio.

5. The drivetrain of claim 1, wherein the control assembly includes an actuator connected to the two-speed final drive assembly and configured to selectively engage one of the low range final drive ratio and the high range final drive ratio.

6. The drivetrain of claim 5, wherein the controller includes, a first control unit in electrical communication with each of the multi-ratio transmission and the actuator, and a second control unit in electrical communication with each of the first control unit, the variable displacement pump, and the purge valve.

7. The drivetrain of claim 1, wherein the input array includes at least one of, a vehicle dynamics array configured to collect data indicative of at least one dynamic condition of the vehicle, a vehicle load detection array configured to collect data indicative of a cargo load applied to the vehicle, a manual override array configured to detect manual input by an operator of the vehicle, and a trailer detection array configured to collect data indicative of a trailer coupled to the vehicle.

8. The drivetrain of claim 1, wherein the input array includes at least one of, mass airflow sensor in electrical communication with the controller, a longitudinal acceleration sensor in electrical communication with the controller, a vehicle speed sensor in electrical communication with the controller, an accelerator pedal position sensor in electrical communication with the controller, and a gear shift lever position sensor in electrical communication with the controller.

9. The drivetrain of claim 1, wherein the input array includes at least one of:

a suspension load sensor; and a cargo load sensor.

10. The drivetrain of claim 1, wherein the input array is configured to calculate an acceleration-based load.

11. The drivetrain of claim 1, wherein the input array includes at least one of:

a low range switch configured to signal the controller to select the low range final drive ratio, a tow/haul switch configured to signal the controller to select the high capacity mode, and a rear differential lock switch configured to signal the controller to select the full capacity mode of a selected one of the high capacity mode and the low capacity mode.

12. The drivetrain of claim 1, wherein the input array includes at least one of a rear facing camera in electrical communication with the controller;

a drawbar load sensor in electrical communication with the controller; and a trailer electrical harness sensor in electrical communication with the controller.

13. A method for controlling the drivetrain according to claim 1 comprising:

collecting data indicative of at least one of a dynamic condition of the vehicle and a static condition of the vehicle; and operating the rear differential assembly in one of the low capacity mode and the high capacity mode based on the data.

14. The method of claim 13, further comprising:

providing a rear differential lock button having an ON position and an OFF position;

providing the rear differential assembly with a full mode for each of the high capacity mode and the low capacity mode;

checking whether the rear differential lock button is in the ON position or the OFF position; and operating the rear differential assembly in the full mode of either of the high capacity mode and the low capacity mode when the rear differential lock button is in the ON position.

15. The method of claim 13, further comprising:

providing a low range button having an ON position and an OFF position;

checking whether the low range button is in the ON position or the OFF position;

operating the two-speed final drive assembly at the low range final drive ratio when the low range button is in the ON position; and operating the rear differential assembly in the high capacity mode when the low range button is in the ON position.

16. A drivetrain for a vehicle comprising:

a multi-ratio transmission;

a final drive assembly connected in series with the multi-ratio transmission and including a low speed final drive ratio and a high speed final drive ratio;

a pair of front driveshafts driven by the final drive assembly;

a pair of rear driveshafts;

a rear differential assembly selectively connected to the final drive assembly and including:

a high capacity mode and a low capacity mode;

an input member driven by the final drive assembly;

at least one clutch assembly selectively coupling the input member to at least one of the pair of rear driveshafts, the at least one clutch assembly including:

at least one driven plate connected to the input member; and at least one driving plate selectively engageable with the plurality of driven plates; and an actuator assembly configured to displace the at least one driven plate into engagement with the at least one driving plate; and a controller in electrical communication with the final drive assembly and the actuator assembly, and the controller being configured to:

select one of a low range mode and a high range mode;

signal the final drive assembly to engage the low speed final drive ratio when the controller selects the low range mode and to engage the high speed final drive ratio when the controller selects the high range mode;

select one of the high capacity mode, the low capacity mode, and a front-wheel drive (FWD) mode; and signal the actuator assembly to engage the at least one driven clutch with the at least one driving plate when the high capacity mode or the low capacity mode is selected.

17. The drivetrain of claim 16, wherein the controller is configured to:

receive data indicative of at least one of a dynamic condition of the vehicle and a static condition of the vehicle; and select the one of the low capacity mode and the high capacity mode based on the received data.

18. The drivetrain of claim 17, wherein the at least one dynamic condition of the vehicle includes at least one of mass airflow, longitudinal acceleration, vehicle speed, pedal position, gear selector position, and a road grade.

19. The drivetrain of claim 17, wherein the at least one static condition of the vehicle includes at least one of a suspension load, a cargo load, a rear view camera image, a connection with a trailer wire harness, a drawbar load applied to the vehicle, and an acceleration-based load.

20. The drivetrain of claim 16, wherein:

the rear differential assembly further includes a full capacity mode for each of the high capacity mode and the low capacity mode such that a respective maximum torque of the selected one of the high capacity mode and the low capacity mode is transmitted through the rear differential;

the actuator assembly further includes a rear differential lock switch having an ON position and an OFF position, a low range switch having an ON position and an OFF position, a tow/haul switch having an ON position and an OFF position, and an all-wheel drive (AWD) switch having an ON position and an OFF position; and the controller being in electrical communication with the rear differential lock switch, the low range switch, the tow/haul switch, and the AWD switch, and the controller being configured to:

select the full capacity mode of the selected one of the high capacity mode and the low capacity mode when the rear differential lock switch is in the ON position;

select the low range mode when the low range switch is in the ON position;

select the high capacity mode when the tow/haul switch is in the ON position;

select the high capacity mode when the tow/haul switch is in the ON position; and select the high capacity mode or the low capacity mode when the AWD switch is in the ON position.

21. The drivetrain of claim 16, wherein the actuator assembly includes:

an on-demand variable displacement pump having a low displacement setting and a high displacement setting;

a purge valve in fluid communication with the on-demand variable displacement pump; and a piston in fluid communication with the on-demand variable displacement pump in parallel with the purge valve, the piston being movable in response to the fluid communication to cause displacement of the at least one driven plate into engagement with the at least one driving plate and the piston applying an engagement force when the at least one driven plate engages the at least one driving plate, and the controller being configured to:

select the low displacement setting when the high capacity mode is selected and select the high displacement setting when the low capacity mode is selected;

select a position of the purge valve based on at least one condition of the vehicle;

signal the variable displacement pump to operate at the selected one of the low displacement setting and the high displacement setting; and signal the purge valve to move to the selected position.

22. The drivetrain of claim 16, wherein the final drive assembly further includes an input gear, an output gear, and a second clutch assembly selectively connecting the output gear to the input gear, the at least one driven plate being connected to one of the pair of rear driveshafts, the clutch assembly further including at least one second driven plate connected to the input member and at least one second driving plate selectively engageable with the at least one second driven plate and connected to another one of the pair of rear driveshafts, the actuator assembly configured to displace the at least one second driven plate into engagement with the at least one second driving plate, and the controller being in electrical communication with the second clutch assembly and configured to:

select one of the FWD mode and an all-wheel drive (AWD) mode;

signal the second clutch to disconnect the input gear from the output gear when the FWD mode is selected;

signal the second clutch to connect the input gear to the output gear when the AWD mode is selected;

select the high range mode when the FWD mode is selected, select the low range mode or the high range mode when the AWD mode is selected;

signal the actuator assembly to modulate an engagement force applied by the at least one driven plate and the at least one second driven plate with the respective at least one driving plate and at least one second driving plate when the AWD mode is selected.

23. The drivetrain of claim 16, further comprising a plurality of sensors in electrical communication with the controller, each sensor being configured to detect a respective condition of the vehicle and to transmit a signal to the controller indicative of the respective condition, and wherein the controller is configured to:

select one of the low range mode and the high range mode based on the signal from at least one of the plurality of sensors, and signal the actuator to displace the at least one driven plate and to apply an engagement force to the driven plate based on the signal from at least one of the plurality of sensors.

24. The drivetrain of claim 16, wherein the controller is configured to:

receive data indicative of a mass airflow rate and of an accelerator pedal position;

calculate a torque value based on the mass airflow data;

compare the torque value to a torque threshold;
compare the accelerator pedal position data to a pedal threshold; and
select the high capacity mode when the torque value is greater than the torque threshold or when the accelerator pedal position data is greater than the pedal threshold.

25. The drivetrain of claim 16, wherein the controller is configured to:
receive data indicative of at least one of a throttle angle and vehicle acceleration;
select a road grade value based on the throttle angle data, the sensed vehicle acceleration data, a predetermined throttle angle, and a predetermined acceleration;
compare the road grade value to a road grade threshold; and
select the high capacity mode when the road grade value is greater than the road grade threshold.

26. The drivetrain of claim 16, wherein the controller is configured to:
receive data indicative of an actual acceleration of the vehicle;
calculate an acceleration-based load based on the actual acceleration and a theoretical acceleration; and
select one of the high capacity mode and the low capacity mode based on the acceleration-based load.

27. The drivetrain of claim 16, wherein a maximum torque transmitted through the rear differential to the rear driveshafts when the rear differential is in the high capacity mode is greater than a maximum torque transmitted through the rear differential assembly when the rear differential assembly is in the low capacity mode.

28. The drivetrain of claim 16, wherein the controller is further configured to:
select one of a plurality of actuator forces based on at least one of a plurality of dynamic conditions and static conditions of the vehicle;
signal the actuator assembly to displace the at least one driven plate into engagement with the at least one driving plate when the high capacity mode or the low capacity mode is selected; and
signal the actuator assembly to apply the selected one of the actuator forces to the at least one driven plate when the at least one driven plate is in engagement with the at least one driving plate.

* * * * *